(12) United States Patent
Koltnow et al.

(10) Patent No.: US 11,488,194 B2
(45) Date of Patent: *Nov. 1, 2022

(54) MOBILE CREDIT ACQUISITION

(71) Applicant: Comenity LLC, Columbus, OH (US)

(72) Inventors: Adam Koltnow, Worthington, OH (US); James Walz, Blacklick, OH (US)

(73) Assignee: Comenity LLC, Columbus, OH (US)

( * ) Notice: Subject to any disclaimer, the term of this patent is extended or adjusted under 35 U.S.C. 154(b) by 269 days.

This patent is subject to a terminal disclaimer.

(21) Appl. No.: 16/195,689

(22) Filed: Nov. 19, 2018

(65) Prior Publication Data
US 2019/0087848 A1    Mar. 21, 2019

Related U.S. Application Data

(62) Division of application No. 14/947,803, filed on Nov. 20, 2015, now Pat. No. 10,169,775.

(60) Provisional application No. 62/200,241, filed on Aug. 3, 2015.

(51) Int. Cl.
| | |
|---|---|
| *G06Q 30/00* | (2012.01) |
| *G06Q 30/02* | (2012.01) |
| *H04W 4/021* | (2018.01) |
| *H04W 4/14* | (2009.01) |
| *G06Q 40/02* | (2012.01) |

(52) U.S. Cl.
CPC ....... *G06Q 30/0236* (2013.01); *G06Q 40/025* (2013.01); *H04W 4/021* (2013.01); *H04W 4/14* (2013.01)

(58) Field of Classification Search
CPC . G06Q 30/0236; G06Q 40/025; H04W 4/021; H04W 4/14
See application file for complete search history.

(56) References Cited

U.S. PATENT DOCUMENTS

| | | |
|---|---|---|
| 5,239,462 A | 8/1993 | Jones et al. |
| 6,144,848 A | 11/2000 | Walsh et al. |
| 6,542,872 B1 | 4/2003 | Skubic et al. |
| 7,546,266 B2 | 6/2009 | Beirne et al. |
| 7,797,231 B1 | 9/2010 | Loeb et al. |

(Continued)

FOREIGN PATENT DOCUMENTS

WO    2015026863 A1    2/2015

OTHER PUBLICATIONS

Rodrigues; MobiPag Integrated Mobile Payment, Ticketing and Couponing; Sensors 2014; pp. 13389-13415; 2014.*

(Continued)

*Primary Examiner* — Radu Andrei

(57) ABSTRACT

A method for mobile credit acquisition is disclosed. The method deploys a shopping incentive offer, the shopping incentive offer for a shopping incentive. A device identifier associated with a user's mobile device is received in response to a user responding to the shopping incentive offer on the user's mobile device. In addition, a user identifier is received for the user. The device identifier and the user identifier are used to obtain user specific information useable for a credit prescreen. The shopping incentive is then provided to the user's mobile device. If the user does pass a credit prescreen, a pre-approved credit offer is also provided to the user via the user's mobile device in conjunction with the shopping incentive.

9 Claims, 6 Drawing Sheets

(56) References Cited

U.S. PATENT DOCUMENTS

| | | | |
|---|---|---|---|
| 8,010,446 B2 | 8/2011 | Talbert et al. | |
| 8,112,349 B2 | 2/2012 | Beirne et al. | |
| 8,412,593 B1 | 4/2013 | Song et al. | |
| 8,423,453 B1* | 4/2013 | Elliott | G06Q 20/4037 |
| | | | 705/38 |
| 8,510,163 B2 | 8/2013 | Hess et al. | |
| 8,738,024 B1 | 5/2014 | Kerr et al. | |
| 9,317,849 B2 | 4/2016 | Pitroda et al. | |
| 9,741,045 B1 | 8/2017 | Henderson et al. | |
| 10,169,775 B2 | 1/2019 | Koltnow et al. | |
| 10,929,924 B2 | 2/2021 | Koltnow et al. | |
| 2006/0068898 A1* | 3/2006 | Maya | G07F 17/3251 |
| | | | 463/25 |
| 2006/0149630 A1* | 7/2006 | Elliott | G06Q 30/02 |
| | | | 705/14.64 |
| 2006/0181411 A1 | 8/2006 | Fast et al. | |
| 2007/0022008 A1 | 1/2007 | Kingsborough et al. | |
| 2008/0010193 A1 | 1/2008 | Rackley, III et al. | |
| 2008/0306749 A1 | 12/2008 | Fredlund et al. | |
| 2009/0099914 A1 | 4/2009 | Lang et al. | |
| 2009/0119202 A1* | 5/2009 | Dumas-Brown | G06Q 40/02 |
| | | | 705/38 |
| 2009/0192928 A1 | 7/2009 | Abifaker | |
| 2010/0316218 A1* | 12/2010 | Hatakeyama | H04L 9/3247 |
| | | | 380/255 |
| 2012/0029996 A1 | 2/2012 | Lang et al. | |
| 2012/0158934 A1 | 6/2012 | Xiao et al. | |
| 2013/0030915 A1 | 1/2013 | Statler et al. | |
| 2013/0254115 A1 | 9/2013 | Pasa et al. | |
| 2014/0006114 A1* | 1/2014 | Nuzzi | G06Q 30/06 |
| | | | 705/14.1 |
| 2014/0040120 A1 | 2/2014 | Cho et al. | |
| 2014/0058870 A1 | 2/2014 | Zhao | |
| 2014/0172477 A1 | 6/2014 | Goulart et al. | |
| 2014/0172687 A1 | 6/2014 | Chirehdast | |
| 2014/0201331 A1 | 7/2014 | Kershaw et al. | |
| 2014/0289809 A1 | 9/2014 | Taylor et al. | |
| 2014/0365334 A1 | 12/2014 | Hurewitz | |
| 2015/0120343 A1 | 4/2015 | Burger-Lenehan et al. | |
| 2015/0140982 A1 | 5/2015 | Postrel | |
| 2015/0170194 A1 | 6/2015 | Stibel et al. | |
| 2015/0227922 A1 | 8/2015 | Filler | |
| 2015/0235230 A1 | 8/2015 | Ainsworth, III et al. | |
| 2015/0242839 A1 | 8/2015 | Sanchez et al. | |
| 2015/0262248 A1* | 9/2015 | Chaouki | G06Q 40/025 |
| | | | 705/14.66 |
| 2015/0310402 A1 | 10/2015 | Balusamy | |
| 2016/0012375 A1 | 1/2016 | Hanson et al. | |
| 2016/0071133 A1 | 3/2016 | Gupta et al. | |
| 2016/0110707 A1 | 4/2016 | Nack et al. | |
| 2016/0180394 A1* | 6/2016 | Tseng | G06F 16/29 |
| | | | 705/14.58 |
| 2016/0189152 A1 | 6/2016 | Walz | |
| 2017/0039588 A1 | 2/2017 | Koltnow et al. | |
| 2017/0039616 A1 | 2/2017 | Korra et al. | |
| 2017/0061511 A1 | 3/2017 | Korra et al. | |
| 2017/0061532 A1 | 3/2017 | Koltnow et al. | |
| 2017/0140356 A1 | 5/2017 | Desai et al. | |
| 2018/0053252 A1 | 2/2018 | Koltnow et al. | |

OTHER PUBLICATIONS

Pousttchi; Analyzing_the_Elements_of_the_Business_Model_for_Mobile_Payment_Service_Provision; IEEE 2007; 8 pages; 2007.*

Martin, "In-Pocket, Phone Beaconing: Tapping into the Store Shopper", http://www.mediapost.com/publications/article/241674/in-pocket-phone-beaconing-tapping-into-the-store.html, Jan. 14, 2015, 1-3.

* cited by examiner

MOBILE CREDIT ACQUISITION

CROSS-REFERNECE TO RELATED APPLICATIONS

The present patent application is a Divisional Application of and claims the benefit of co-pending U.S. patent application Ser. No. 14/947,803, filed Nov. 20, 2015, entitled "MOBILE CREDIT ACQUISITION" by Adam Koltnow et al., and assigned to the assignee of the present application which is incorporated in its entirety herein.

U.S. patent application Ser. No. 14/947,803 claims priority to and benefit of U.S. Provisional Patent Application No. 62/200,241, filed on Aug. 3, 2015, entitled "MOBILE CREDIT ACQUISITION" by Adam Koltnow et al., and assigned to the assignee of the present application, the disclosure of which is hereby incorporated herein by reference in its entirety.

BACKGROUND

Company specific, brand specific or even store specific credit accounts provide significant value to both consumer and provider. By issuing a store specific credit account, the provider is able to tailor rewards offers, provide loyalty discounts and maintain consumer brand loyalty. Similarly, the consumer receives the perks from the reward offers and the loyalty discounts. In addition, a user receiving the rewards and discounts will often recommend the credit account to friends via word of mouth, social networks, internet rating sites, and the like.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

DESCRIPTION OF EMBODIMENTS

Figure 1:
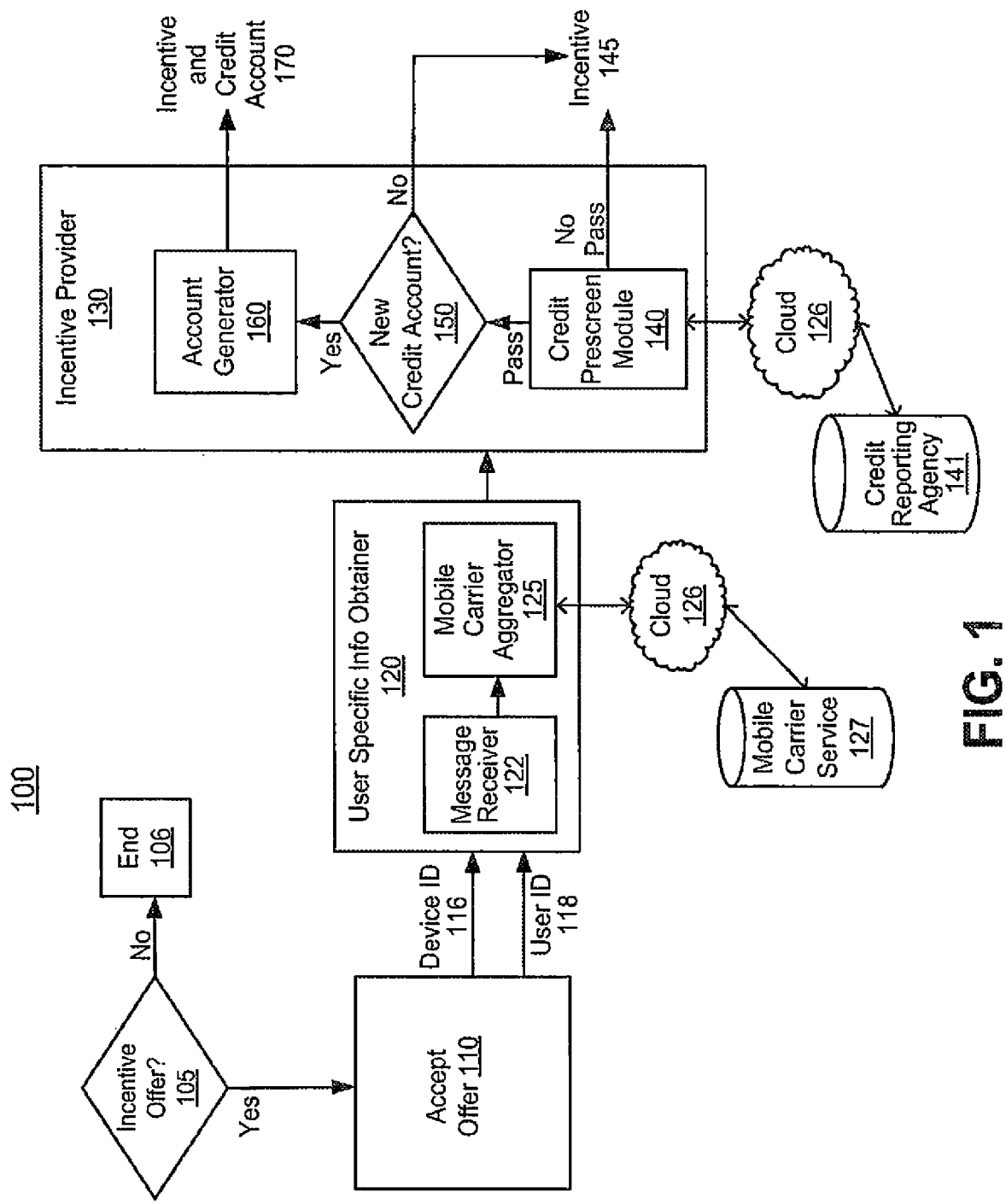
FIG. 1 is a block diagram of a mobile credit acquisition system, in accordance with an embodiment.

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "selecting", "outputting", "inputting", "providing", "receiving", "utilizing", "obtaining", "updating", "accessing", "changing", "correlating", "prescreening", "developing", "presenting", "deploying" or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

Overview

Mobile credit acquisition is discussed herein. In one embodiment, the offer and acceptance occur via interaction with the user through the user's mobile device. In one embodiment, by providing the offers and responses via the user's mobile device the user can receive and review the offer at a less stressful location as compared to when the offer is made by an associate at the point of sale (POS). That is, by moving the offer and acceptance away from the POS the user does not feel "put on the spot" or rushed by other customers in line, etc.

For purposes of the discussion, a user's mobile device may be a mobile phone, a smart phone, a tablet, a smart watch, a piece of smart jewelry, smart glasses, and other user portable devices having wireless connectivity. That is, the mobile device would be capable of broadcasting and receiving via at least one network, such as, but not limited to, WiFi, Cellular, Bluetooth, NFC, and the like. In one embodiment, the mobile device may have a positioning determining system. In another embodiment, the mobile device may be able to determine location within a given radius, such as the broadcast range of a beacon, WiFi hotspot, overlapped area covered by a plurality of mobile telephone signal providers, or the like.

In the following discussion, the term "prescreen" is utilized. In general, prescreen refers to a credit prescreen for a user. That is, a screening of a user based on some sort of identification information that allows a likely credit determination to be performed via a credit reporting agency. For example, if Consumer 1 is pre-screened, identifying information would be obtained, such as, his name and current address. The name and current address would be used to perform a credit check of Consumer 1's credit history and qualifications based on the credit issuer's selection criteria.

In one embodiment, the check may occur at one of a number of possible credit reporting agencies. However, in another embodiment, the check of Consumer 1's credit history may be limited, such as, to his credit history with one given credit reporting agency.

It should be appreciated that the obtaining or accessing of user information conforms to applicable privacy laws (e.g., federal privacy laws, state privacy laws, etc.) and applicable fair credit reporting act laws. In one embodiment, prior to accessing user information, the user affirmatively "opts-in" to the services described herein. For example, during the use of an issuer's mobile application, the user is prompted with a choice to affirmatively "opt-in" to various services. As a result, any information is obtained with the user's prior permission.

Moreover, depending on present or future credit prescreening requirements, rules and regulations, the credit prescreen described herein may be more or less formal. For example, if the legislation requires a user be informed, or provide authorization, before a review of the user's credit score is authorized, the credit prescreen described herein would be modified to remain within the meets and bounds of the applicable laws.

Operation

Referring now to FIG. 1, a block diagram of a mobile credit acquisition system 100 is shown in accordance with an embodiment. In one embodiment, mobile credit acquisition system 100 includes a shopping incentive offer 105, an offer acceptance 110, a user specific information obtainer 120 and a shopping incentive provider 130. Although a number of applications and components are shown in mobile credit acquisition system 100, it should be appreciated that the components and applications may be located separately from one another. For example, one or more of the components and applications may be found on one or more locations, such as, but not limited to a computer in the retail store, a server at a remote location, on the cloud 126 or the like.

In general, offer 105 is a shopping incentive offer for a user intended to be redeemed via a user's mobile device. For example, offer 105 may be a digitally redeemable shopping incentive. For example, the offer may be a discount percentage, a free gift, a coupon, a surprise gift, a surprise reward, or the like. Offer 105 may be a physical item such as a poster, or the like and include a visual code such as a barcode, a QR code, a number to text, an email address to reply to, or the like. In another embodiment, offer 105 is received by the user's mobile device, e.g., via a beacon broadcast, WiFi broadcast, email, text, SMS, social media alert, app alert, or the like. In yet another embodiment, offer 105 may be provided by an app on the user's mobile device once the mobile device is within a certain vicinity of the store providing the offer.

If a user does not chose to accept offer 105 then the system goes to end 106 and no further actions are taken.

At offer acceptance 110, a number of different options may be available to accept the offer 105. For example, the offer acceptance may be in the form of a message interaction such as shown and described in further detail in FIGS. 3A and 3B. In one embodiment, offer acceptance 110 includes providing a mobile device ID 116 and a user ID 118.

In general, device ID 116 can be the mobile device's phone number, SIM card integrated circuit card identifier (ICCID), unique device identifier (UDID), or the like.

User ID 118 can be the user's zip code, social security number or portion thereof, driver's license number or portion thereof, or the like.

Thus, a user's acceptance of offer 105 will include enough information for the mobile credit acquisition system 100 to perform a prescreen of the user for purposes of offering the user an opportunity to obtain a credit account.

In one embodiment, user specific information obtainer 120 includes acceptance message receiver 122 and mobile carrier aggregator 125. Acceptance message receiver 122 will receive the acceptance message accepting the digitally redeemable shopping incentive, from a user's mobile device. The acceptance message will include device ID 116 and user ID 118. Acceptance message receiver 122 will pass the information to mobile carrier aggregator 125.

In one embodiment, mobile carrier aggregator 125 will access a mobile carrier service 127 and use device ID 116 and user ID 118 to obtain user specific information useable for a credit prescreen. For example, mobile carrier aggregator 125 may access mobile carrier service 127 over the cloud 126. An example of cloud 126 is a network such as the Internet, local area network (LAN), wide area network (WAN), or the like.

In one embodiment, mobile carrier aggregator 125 will perform a search over a plurality of mobile carriers using the device ID 116. Once the user's carrier is identified, mobile carrier aggregator 125 will use the user ID 118 to obtain user specific information useable for a credit prescreen, from the user's mobile carrier. In one embodiment, user specific information obtained from the user's mobile carrier could be one or more of: a name and address, a driver's license number, a social security number, or the like.

User specific information obtainer 120 will then provide the user specific information to incentive provider 130. In one embodiment, incentive provider 130 includes a credit prescreen module 140, a new credit account offer 150 and a credit account generator 160. Although a number of applications and components are shown, it should be appreciated that there may be more of fewer components and applications of incentive provider 130. Moreover, different pieces may be combined, re-organized, located separately from one another, or the like.

In general, credit prescreen module 140 accesses a credit reporting agency 141 via cloud 126 to determine credit information for the user based on the identification information. An example of cloud 126 is a network such as described herein. The credit reporting agency 141 may be a company such as, but not limited to, Experian, Equifax, TransUnion, Innovis and the like.

Credit prescreen module 140 will analyze the user's credit information provided by credit reporting agency 141 to determine if the user passes a prescreen credit criteria. In one embodiment, credit prescreen module 140 will also receive a minimum amount. In general, minimum amount refers to a minimum credit limit for the user to prequalify. For example, the minimum amount may be 500.00 USD. In the case where credit prescreen module 140 receives a minimum amount, credit prescreen module 140 will utilize the user's credit information provided by credit reporting agency 141 in conjunction with the minimum amount requirement to determine if the user is reasonably likely to receive an acceptable credit line if approved upon application for credit.

If the user does not pass the prescreen, the digitally redeemable shopping incentive 145 is provided to the user's mobile device and no further action is taken by mobile credit acquisition system 100. Thus, regardless of whether or not the user passes the prescreen, the shopping incentive 145 is provided to the user.

However, if the user does pass the credit prescreen then new credit account 150 provides an offer for a credit account to the user's mobile device. In one embodiment, the pre-approved credit offer is provided in conjunction with the digitally redeemable shopping incentive 145. In one embodiment, an additional shopping incentive offer is also provided to the user, wherein the additional shopping incentive becomes available after the user successfully completes the pre-approved credit offer.

If the user does not respond to the new credit account offer, then no further action is taken by mobile credit acquisition system 100.

However, if the user does accept the new credit account offer, then credit account generator 160 generates a new credit account and provides the incentive and credit account 170. That is, credit account generator 160 provides a digital credit account identifier at the mobile device after the user successfully completes the pre-approved credit offer. In one embodiment, the digital credit account identifier is instantly available to be used as a form of payment. Additional details regarding the digital credit account identifier are shown and described with reference to FIGS. 3A and 3B herein.

Figure 2:
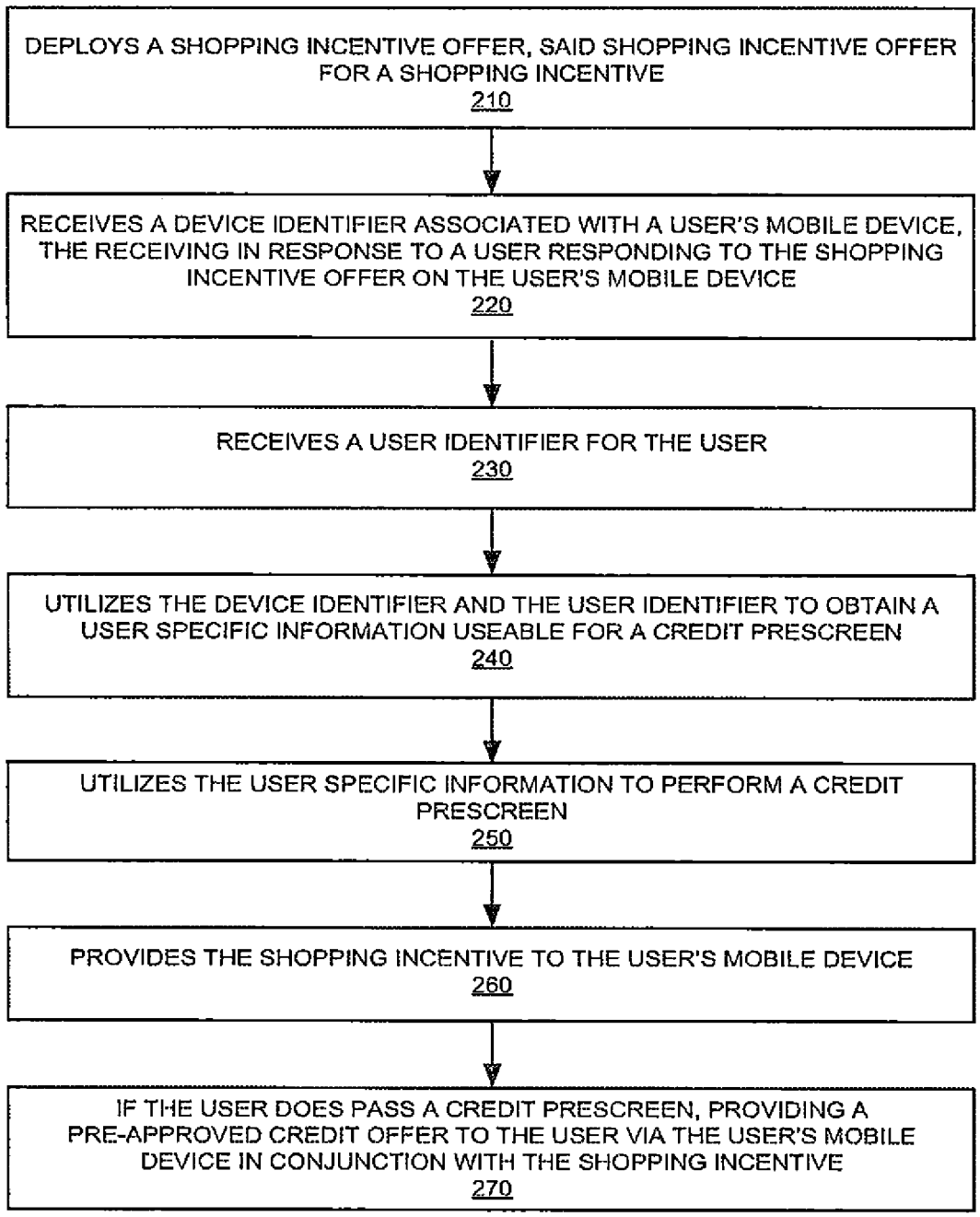
FIG. 2 is a flow chart of a method for mobile credit acquisition, in accordance with an embodiment.
Figure 3A:
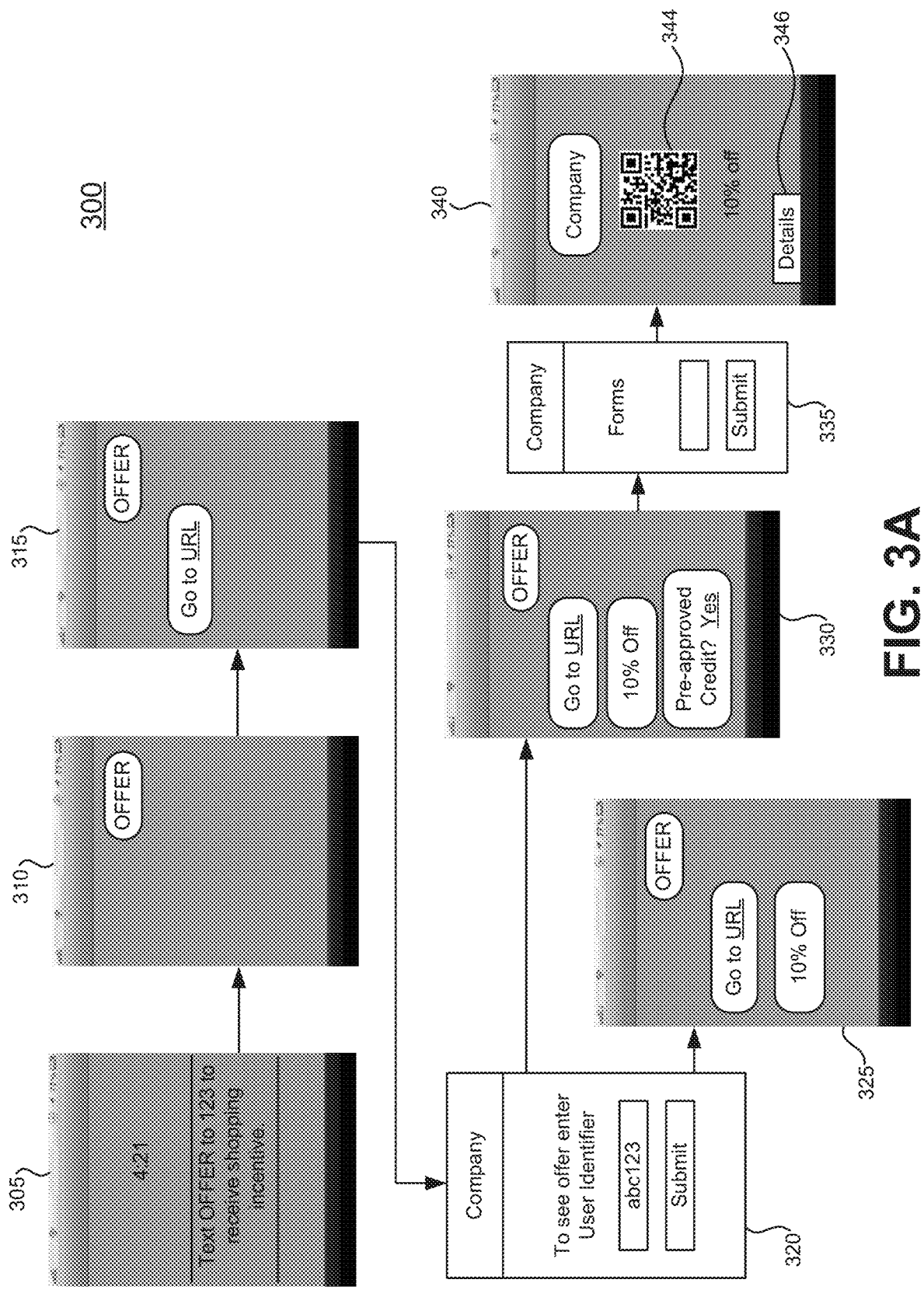
FIG. 3A is a block diagram of a mobile credit acquisition as viewed on a user's mobile device, in accordance with an embodiment.
Figure 3B:
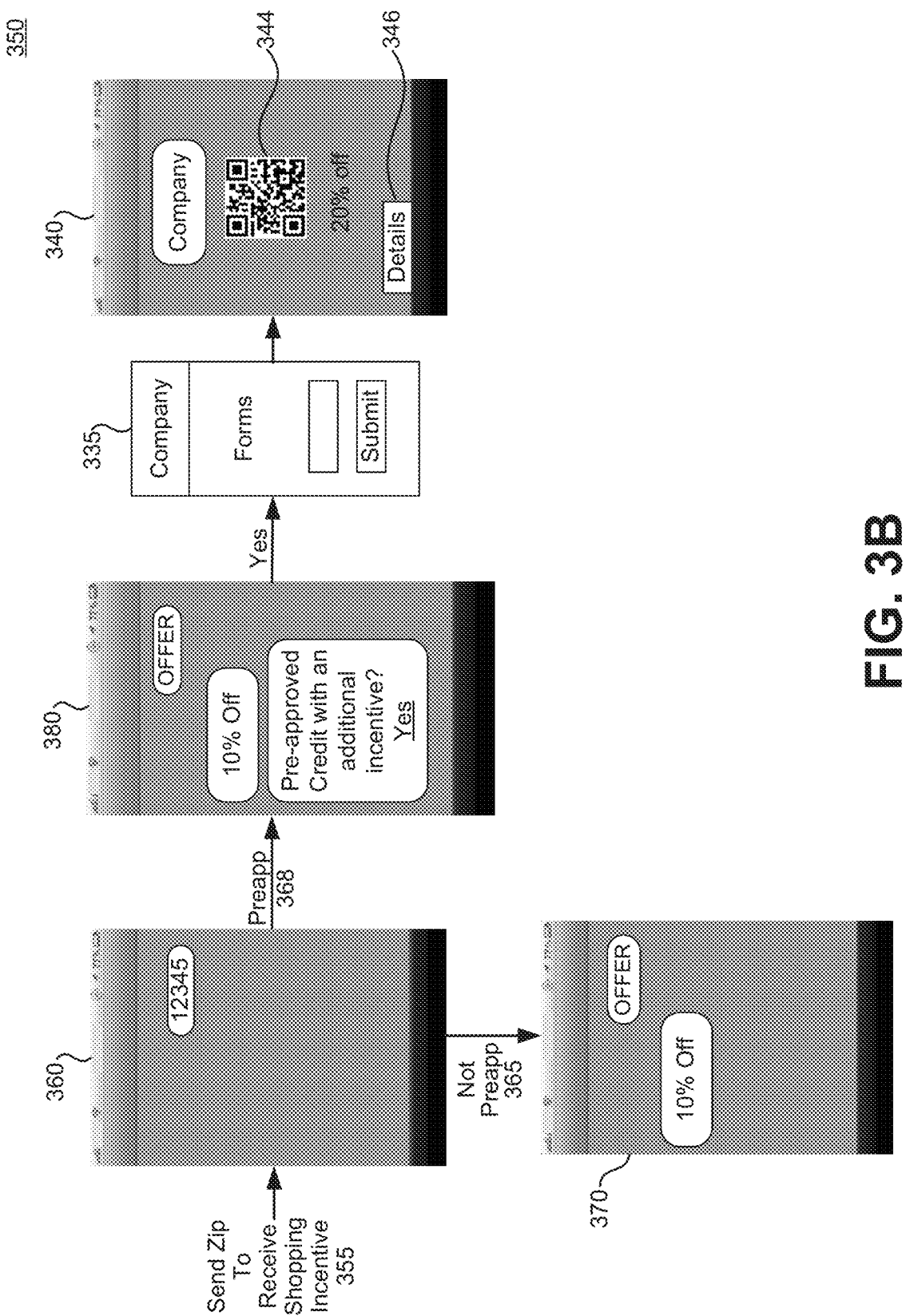
FIG. 3B is a block diagram of another embodiment for mobile credit acquisition as viewed on a user's mobile device, in accordance with an embodiment.

With reference now to FIG. 2, a flowchart 200 of a method for mobile credit acquisition is shown in accordance with an embodiment. FIGS. 3A and 3B are also utilized to provide clarity and support for the discussion of flowchart 200. FIG. 3A is a block diagram 300 of a mobile credit acquisition as viewed on a user's mobile device shown in accordance with an embodiment and FIG. 3B is a block diagram 350 of another embodiment for mobile credit acquisition as viewed on a user's mobile device is shown in accordance with an embodiment. Although the interactions between user's mobile device and the offeror are shown in the format of text messages, it should be appreciated that the interactions may be made via one or more of: a beacon broadcast, WiFi broadcast, email, text, SMS, social media alert, app alert, or the like.

With reference now to 210 of FIG. 2, one embodiment deploys a shopping incentive offer 105. One embodiment deploys the shopping incentive offer 105 in a physical location within a retail store providing the shopping incentive such as shown and described with reference to FIG. 4 herein. In another embodiment, offer 105 is provided to the user's mobile device when a location of the user's mobile device is in proximity to a retail store providing the shopping incentive.

For example, offer 105 may be a physical item such as a poster, or the like and include a visual code such as a barcode, a QR code, a number to text, an email address to reply to, or the like. In another embodiment, offer 105 is received by the user's mobile device, e.g., via a beacon broadcast, WiFi broadcast, email, text, SMS, social media alert, app alert, or the like. In yet another embodiment, offer 105 may be provided by an app on the user's mobile device once the mobile device is within a certain vicinity of the store providing the offer.

With reference now to 220 of FIG. 2, one embodiment receives a device identifier associated with a user's mobile device, the receiving in response to a user responding electronically to the shopping incentive offer on the user's mobile device. Device ID 116 may be the mobile device's phone number, SIM card integrated circuit card identifier (ICCID), unique device identifier (UDID), or the like.

For example, as shown in FIG. 3A at 305 the user receives an offer 105 that requests a text be sent to 123 to receive the shopping incentive. At 310 when the user texts "offer" to 123, the user's device ID 116 will be available.

With reference now to 230 of FIG. 2, one embodiment receives a user identifier for the user. User ID 118 may be the user's zip code, social security number or portion thereof, driver's license number or portion thereof, or the like.

For example, as shown in FIG. 3A at 315 the user receives a response that includes a URL. When the user clicks on the link, the user is led to a company page 320 that asks the user to provide a user ID 118. In one embodiment, the company page 320 is a web page, a micro page or the like. After the user submits a response to page 320, the user ID will be received. In one embodiment, the response will be a providing of the zip code associated with the user of the mobile device.

In another embodiment, 220 and 230 of FIG. 2 may be performed in a single step, such as shown in FIG. 3B. For example, at 355 of FIG. 3B, the offer asks the user to send her zip code as the initial response to receive the shopping incentive. At 360, when the user sends the zip code, both the user ID 118 and the device ID 116, e.g., phone number, will be received. That is, in a single response from the user accepting the shopping incentive offer.

With reference now to 240 of FIG. 2, one embodiment utilizes the device identifier and the user identifier to obtain user specific information useable for a credit prescreen. In one embodiment, user specific information could be one or more of: a name and address, a driver's license number, a social security number, or the like.

One embodiment utilizes mobile carrier aggregator 125 to obtain the user specific information as described in FIG. 1. For example, mobile carrier aggregator 125 will contact a plurality of mobile carriers and utilizes the device ID 116 to determine the specific mobile carrier providing service for the user's mobile device. Then, the mobile carrier aggregator 125 will use the user ID 118 to obtain, from the specific mobile carrier, the user specific information useable for a credit prescreen.

In another embodiment, the user specific information may be obtained by performing an internet search with the user ID 118 and the device ID 116. For example, the search may include social media sites, search engines, online public records, and the like.

With reference now to 250 of FIG. 2, one embodiment utilizes user specific information to perform a credit prescreen. In one embodiment, the prescreen is performed at a credit reporting agency 141. However, in another embodiment, the prescreen may not be performed at a credit reporting agency but will instead be based on other aspects, such as, but not limited to, the user's mobile carrier account history, the user's home ownership and the like. For example, if a user is identified as being a home owner, the offer of credit may be provided without need of a prescreen being performed at a credit reporting agency.

In another embodiment, if the user is young, e.g., 18-25 and does not have a well-established credit history, the user may be offered a low risk credit account, such as a credit account with a 200-500 dollar limit. In so doing, the user will be able to receive a credit account offer with little risk being taken by the credit account provider.

Referring now to 260 of FIG. 2, one embodiment provides the shopping incentive to the user's mobile device. For example, at 325 of FIG. 3A, the user receives the 10% off offer. Similarly, in FIG. 3B, if the user is not pre-approved 365 then at 370 the user receives the 10% offer. Although the offer is shown as being 10% off, that is merely for purposes of clarity. The offer may be any of the types such as described in conjunction with FIG. 1.

With reference now to 270 of FIG. 2, if the user does pass a credit prescreen, one embodiment provides a pre-approved credit offer to the user via the user's mobile device in conjunction with the shopping incentive. For example, at 330 of FIG. 3A, the user receives the 10% off offer and also receives a pre-approved credit offer at the user's mobile device.

In addition, one embodiment provides an additional shopping incentive offer to the user, the additional shopping incentive available when the user successfully completes the pre-approved credit offer. For example, as shown in 380 of FIG. 3B, the user receives the 10% off offer and also receives an additional incentive provided with the offer for the pre-approved credit account at the mobile device. In one embodiment, the additional shopping incentive becoming available after the user successfully completes the pre-approved credit offer.

With reference now to 335 of FIGS. 3A and 3B, in one embodiment when the user accepts the pre-approved credit offer, the user is directed to a credit application acceptance page. In one embodiment, credit application information is pre-filled with the information previously obtained.

With reference now to 340 of FIGS. 3A and 3B, one embodiment provides a digital credit account identifier 344 to the user's mobile device when the user successfully completes the pre-approved credit offer, the digital credit account identifier 344 instantly available to be used as a form of payment. For example, the digital credit account identifier 344 received at the mobile device may be a QR code, bar code, digital image of a credit card, or other type of identifier for providing credit account information digitally to a POS.

Thus, by prescreening the user and providing an offer to apply for store credit only to a prequalified user, the concern of embarrassing the user due to denial of credit is reduced. Moreover, by providing the offer to the user on the user's mobile device, the store can move the interaction and offer away from the register area.

Figure 4:
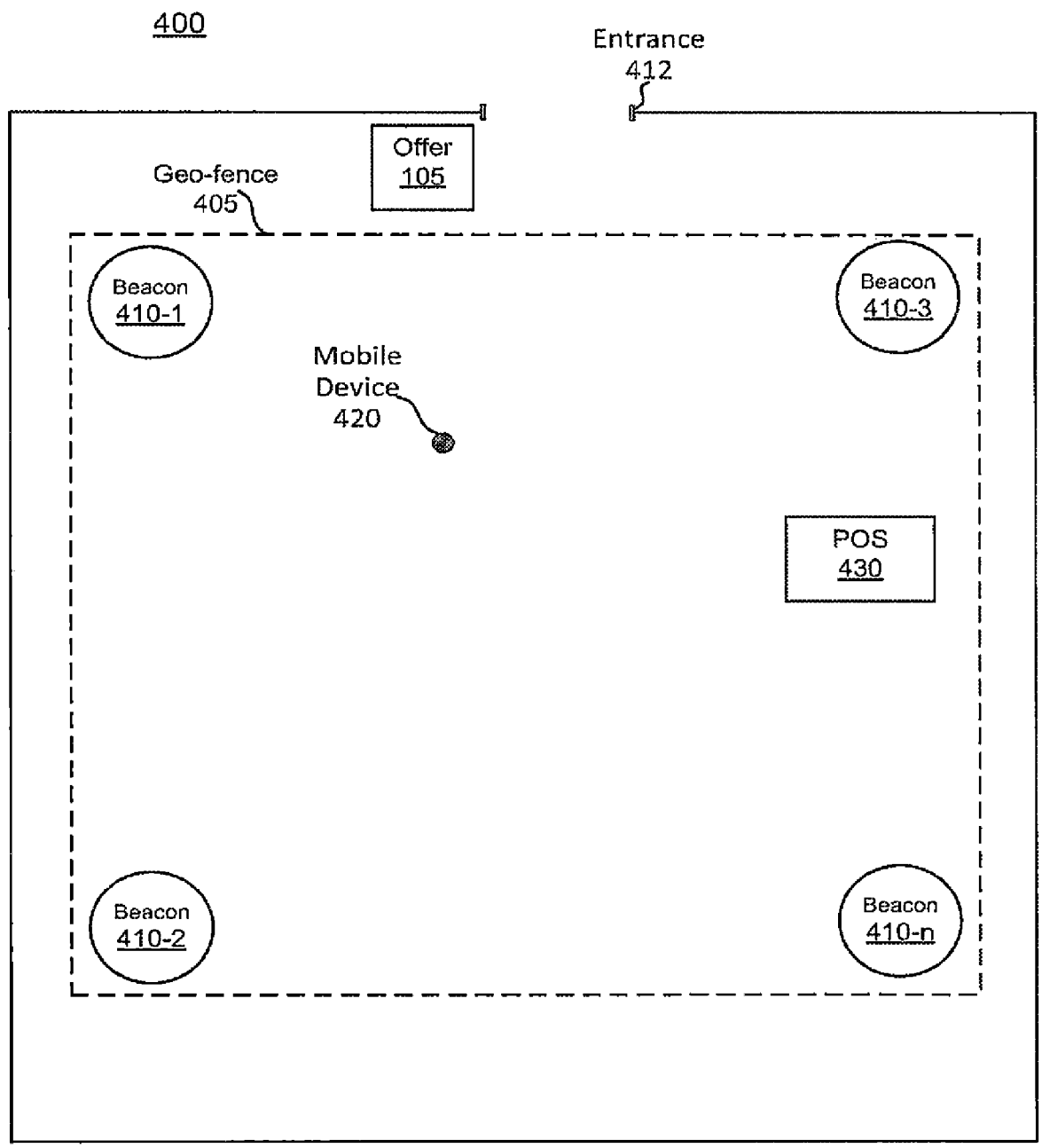
FIG. 4 is a block diagram that illustrates an embodiment of a retail establishment for mobile credit acquisition in accordance with an embodiment.

Referring now to FIG. 4, a top plan view of a retail store 400 is shown in accordance with an embodiment. In general, retail store 400 is any physical brick and mortar store that provides goods for sale at the store location. In one embodiment, retail store 400 includes an entrance 412. In addition, in different embodiments and configurations, retail store 400 can include one or more of, offer 105, geo-fence 405, beacons 410-1 through 410-n, point of sale (POS) 430

In one embodiment, the offer 105 may be provided based on a location of a user as determined by the user's mobile device 420. For example, if the location of the offer 105 is static, such as by the entrance 412 to retail store 400, then when the user's mobile device 420 utilizes information found in offer 105, it would be likely that the user is located near retail store 400. For example, the offer 105 may be a physical item such as a poster, or the like and include a visual code such as a barcode, QR code, or the like. As such, offer 105 may be scanned to be redeemed.

Similarly, if the offer is provided via a beacon such as one or more of beacons 410-1 through 410-n the user's mobile device 420 would have to be near, or in range of, the beacon broadcasting the offer. In another example, the offer is provided by an application on the user's mobile device 420 after the user enters into the area defined by geo-fence 405. In yet another embodiment, the offer is provided on the user's mobile device 420 when a location capability of the user's mobile device determines that the user's mobile device 420 is located near retail store 400. In general, near retail store 400 refers to a location such as, within the bounds of the store, within a few yards of the store, within the mall in which store 400 is located, within a beacon or WiFi broadcast range of store 400, or within a block of retail store 400.

For purposes of the present discussion, the mobile device location service, can be, but is not limited to, GPS, WiFi, cellular service, beacon derived location determination and the like. Moreover, the location determined by the mobile device location service may be useful even at differing levels of accuracy. For example, a GPS enabled mobile device 420 can provide location information that is accurate to within a few meters while a cellular service, beacon or WiFi location capabilities of mobile device 420 can provide a location radius or location area. For example, the mobile device 420 being located within range of a beacon, within the overlapping area of a number of cellular service towers, etc.

For purposes of the discussion, geo-fence 405 refers to a virtual perimeter defining a real-world geographic area. Moreover, geo-fence 405 can be created by various means, one of which includes the use of beacons. For example, in FIG. 4, geo-fence 405 is a rectangle created by the locations of beacons 410-1, 410-2, 410-3, and 410-n. However, it should be appreciated that a beacon established geo-fence 405 can be any shape based on the number and location of beacons used to generate the geo-fence 405.

In general, the one or more of beacons 410-1 through 410-n are devices that are configured to be communicatively coupled with user's mobile device 420, such as via near field communication (NFC), Bluetooth, WiFi, or the like. In one embodiment, one or more of beacons 410-1 through 410-n is an iBeacon™, which is an indoor positioning system from Apple Inc. For example, the iBeacon is a low-powered, low-cost transmitter that can notify nearby iOS and/or Android devices of their presence. Although an iBeacon is provided as a specific example, the beacons are not limited to only that brand. Different beacons from other companies would also likely be acceptable.

Additionally, user's mobile device 420 can be enabled to look for the transmission of one or more of beacons 410-1 through 410-n. When user's mobile device 420 is within physical proximity to the beacon and detects it, the application can notify the user of the offer.

For example, the offer 105 may be provided to user's mobile device 420 while the user is within retail store 400 such as after the user enters geo-fence 405. In general, the offer 105 may be delivered via, a text message, e-mail, push message, other type of in App display, or the like. As described herein, the offer provides an opportunity for the user to receive a shopping incentive.

Retail store 400 include a point of sale (POS) 430, and optionally one or more of a static offer 105, a geo-fence 405, and one or more of beacons 410-1 through 410-n. In one instance, the user's mobile device 420 may include a retail store 400 application but may not have a credit account therewith.

Example Computer System Environment

Figure 5:
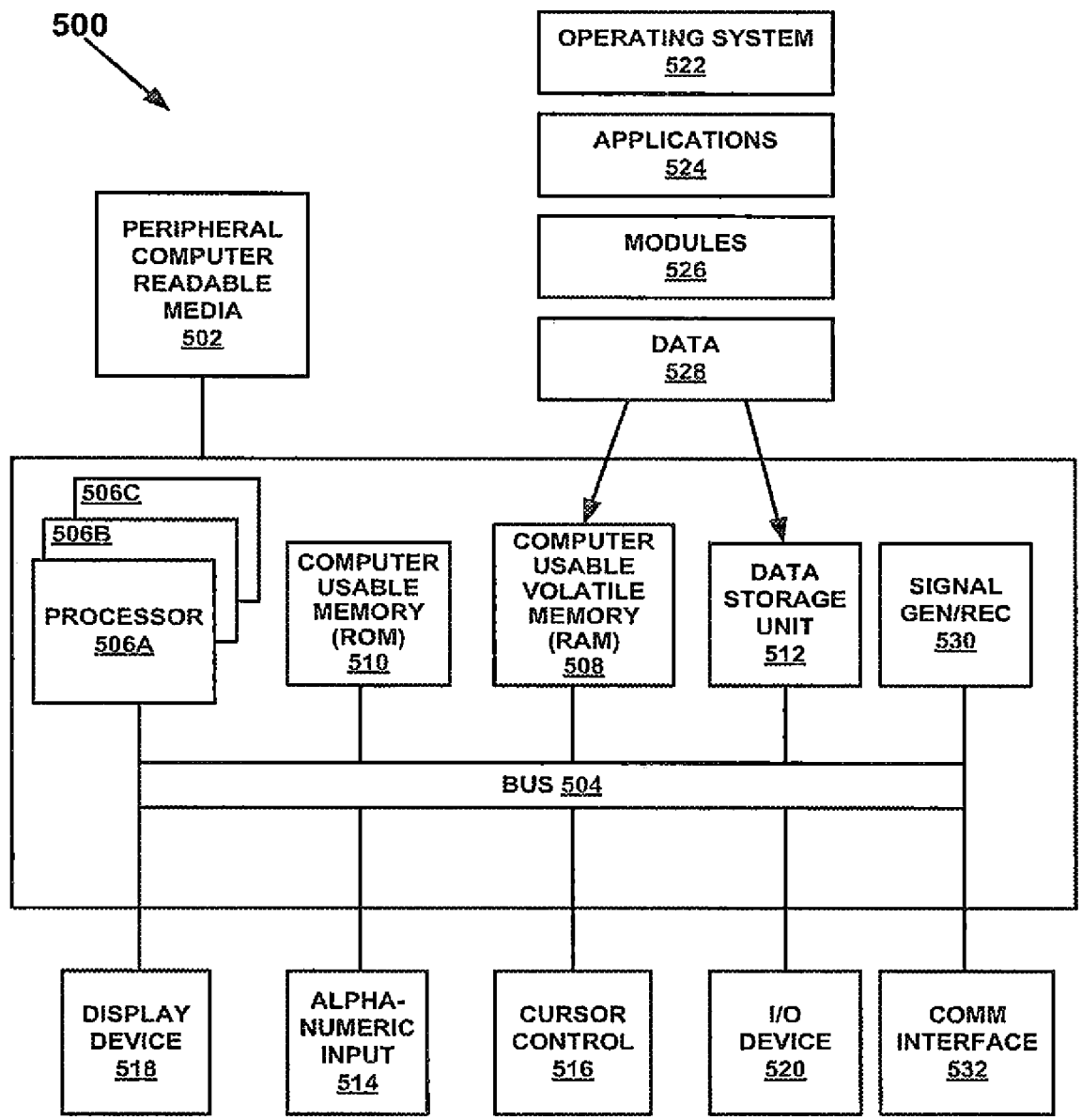
FIG. 5 is a block diagram of an example computer system with which or upon which various embodiments of the present invention may be implemented.

With reference now to FIG. 5, portions of the technology for providing a communication composed of computer-readable and computer-executable instructions that reside, for example, in non-transitory computer-readable storage media of a computer system. That is, FIG. 5 illustrates one example of a type of computer that can be used to implement embodiments of the present technology. FIG. 5 represents a system or components that may be used in conjunction with aspects of the present technology. In one embodiment, some or all of the components described herein may be combined with some or all of the components of FIG. 5 to practice the present technology.

FIG. 5 illustrates an example computer system 500 used in accordance with embodiments of the present technology. It is appreciated that system 500 of FIG. 5 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 5, computer system 500 of FIG. 5 is well adapted to having peripheral computer readable media 502 such as, for example, a disk, a compact disc, a flash drive, and the like coupled thereto.

Computer system 500 of FIG. 5 includes an address/data/control bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors. Computer system 500 also includes data storage features such as a computer usable volatile memory 508, e.g., random access memory (RAM), coupled to bus 504 for storing information and instructions for processors 506A, 506B, and 506C.

System 500 also includes computer usable non-volatile memory 510, e.g., read only memory (ROM), coupled to bus 504 for storing static information and instructions for processors 506A, 506B, and 506C. Also present in system 500 is a data storage unit 512 (e.g., a magnetic disk drive, optical disk drive, solid state drive (SSD), and the like) coupled to bus 504 for storing information and instructions. Computer system 500 also includes an optional alpha-numeric input device 514 including alphanumeric and function keys coupled to bus 504 for communicating information and command selections to processor 506A or processors 506A, 506B, and 506C. Computer system 500 also includes an optional cursor control device 516 coupled to bus 504 for communicating user input information and command selections to processor 506A or processors 506A, 506B, and 506C. Optional cursor control device may be a touch sensor, gesture recognition device, and the like. Computer system 500 of the present embodiment also includes an optional display device 518 coupled to bus 504 for displaying information.

Referring still to FIG. 5, optional display device 518 of FIG. 5 may be a liquid crystal device, cathode ray tube, OLED, plasma display device or other display device suitable for creating graphic images and alpha-numeric characters recognizable to a user. Optional cursor control device 516 allows the computer user to dynamically signal the movement of a visible symbol (cursor) on a display screen of display device 518. Many implementations of cursor control device 516 are known in the art including a trackball, mouse, touch pad, joystick, non-contact input, gesture recognition, voice commands, bio recognition, and the like. In addition, special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands.

System 500 is also well suited to having a cursor directed by other means such as, for example, voice commands. Computer system 500 also includes an I/O device 520 for coupling system 500 with external entities. For example, in one embodiment, I/O device 520 is a modem for enabling wired or wireless communications between system 500 and an external network such as, but not limited to, the Internet or intranet. A more detailed discussion of the present technology is found below.

Referring still to FIG. 5, various other components are depicted for system 500. Specifically, when present, an operating system 522, applications 524, modules 526, and data 528 are shown as typically residing in one or some combination of computer usable volatile memory 508, e.g. random access memory (RAM), and data storage unit 512. However, it is appreciated that in some embodiments, operating system 522 may be stored in other locations such as on a network or on a flash drive; and that further, operating system 522 may be accessed from a remote location via, for example, a coupling to the internet. In one embodiment, the present technology, for example, is stored as an application 524 or module 526 in memory locations within RAM 508 and memory areas within data storage unit 512. The present technology may be applied to one or more elements of described system 500.

System 500 also includes one or more signal generating and receiving device(s) 530 coupled with bus 504 for enabling system 500 to interface with other electronic devices and computer systems. Signal generating and receiving device(s) 530 of the present embodiment may include wired serial adaptors, modems, and network adaptors, wireless modems, and wireless network adaptors, and other such communication technology. The signal generating and receiving device(s) 530 may work in conjunction with one or more communication interface(s) 532 for coupling information to and/or from system 500. Communication interface 532 may include a serial port, parallel port, Universal Serial Bus (USB), Ethernet port, Bluetooth, thunderbolt, near field communications port, WiFi, Cellular modem, or other input/output interface. Communication interface 532 may physically, electrically, optically, or wirelessly (e.g., via radio frequency) couple computer system 500 with another device, such as a mobile phone, radio, or computer system.

The computing system 500 is only one example of a suitable computing environment and is not intended to suggest any limitation as to the scope of use or functionality of the present technology. Neither should the computing environment be interpreted as having any dependency or requirement relating to any one or combination of components illustrated in the example computing system 500.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A non-transitory computer-implemented method for mobile credit acquisition, the method comprising:
   deploying a shopping incentive offer, said shopping incentive offer for a shopping incentive;
   responding electronically to said shopping incentive offer via a user's mobile device, said responding comprising:
      providing a user identifier associated with a user of the user's mobile device; and
      providing a device identifier associated with said user's mobile device;
   receiving at a computer system of a credit provider and from said user's mobile device, said user identifier and said device identifier;
      utilizing, at said computer system, said device identifier and said user identifier to obtain a user specific information, said obtaining of said user specific information comprising:
         utilizing, at said computer system, said device identifier to determine a mobile carrier providing a service for said user's mobile device; and
         providing, via said computer system and to said mobile carrier, said user identifier to obtain, from said mobile carrier, said user specific information;
      utilizing, via said computer system, said user specific information to perform a credit prescreen; and
   providing to said user's mobile device and from said computer system, a pre-approved credit offer in conjunction with said shopping incentive at said user's mobile device.

2. The non-transitory computer-implemented method of claim 1, wherein said deploying said shopping incentive offer further comprises:
   deploying said shopping incentive offer in a physical location within a retail store providing said shopping incentive.

3. The non-transitory computer-implemented method of claim 1, wherein said deploying said shopping incentive offer further comprises:
   deploying said shopping incentive offer to said user's mobile device when a location of said user's mobile device is in proximity to a retail store providing said shopping incentive.

4. The non-transitory computer-implemented method of claim 1, further comprising:
   receiving a phone number associated with said user's mobile device as said device identifier.

5. The non-transitory computer-implemented method of claim 1, further comprising:
   receiving a zip code as said user identifier.

6. The non-transitory computer-implemented method of claim 1, wherein receiving said device identifier and receiving said user identifier further comprises:
   receiving both said user identifier and said device identifier in a single response from said user's mobile device.

7. The non-transitory computer-implemented method of claim 1, wherein said performing of said credit prescreen further comprises:
   providing, via said computer system, said user specific information to a credit reporting agency; and
   receiving, at said computer system, a credit prescreen result from said credit reporting agency based on said user specific information.

8. The non-transitory computer-implemented method of claim 1, further comprising:
   providing an additional shopping incentive offer to said user, in conjunction with said shopping incentive and said pre-approved credit offer, said additional shopping incentive offer including a contingency such that said additional shopping incentive is only available after said user successfully completes said pre-approved credit offer.

9. The non-transitory computer-implemented method of claim 1, further comprising:
   providing a digital credit account identifier to said user's mobile device when said user successfully completes said pre-approved credit offer, said digital credit account identifier instantly available to be used as a form of payment.

* * * * *